United States Patent [19]

Mahaffy et al.

[11] E Re. 29,937

[45] Reissued Mar. 20, 1979

[54] CONTINUOUS MOVEMENT PACKAGING MACHINE

[75] Inventors: Reid A. Mahaffy, Montclair; James C. Kimbaris, Parsippany; Russell DiDonato, Maplewood, all of N.J.

[73] Assignee: Mahaffy & Harder Engineering Co., Totowa, N.J.

[21] Appl. No.: 865,719

[22] Filed: Dec. 29, 1977

Related U.S. Patent Documents

Reissue of:

[64] Patent No.: 3958394
Issued: May 25, 1976
Appl. No.: 442,780
Filed: Feb. 15, 1974

U.S. Applications:

[63] Continuation of Ser. No. 217,209, Jan. 12, 1972, Pat. No. 3,958,394.

[51] Int. Cl.[2] ..... B65B 31/02; B65B 47/02

[52] U.S. Cl. ..... 53/511; 53/559; 425/388

[58] Field of Search ..... 53/112 R, 112 A, 184, 53/282; 425/388

[56] References Cited

U.S. PATENT DOCUMENTS

| | | | |
|---|---|---|---|
| 3,343,336 | 9/1967 | Bradford | 53/184 X |
| 3,545,163 | 12/1970 | Mahaffy et al. | 53/184 X |
| 3,733,773 | 5/1973 | Hamilton | 53/184 |
| 3,808,772 | 5/1974 | Turtschan | 53/184 X |

*Primary Examiner*—Travis S. McGehee
*Attorney, Agent, or Firm*—Parmelee, Johnson, Bollinger & Bramblett

[57] ABSTRACT

A packaging machine for thermoforming plastic packages, filling them with the desired contents, and sealing them under vacuum or gas if desired, wherein a train of packages move through the machine in a horizontal path at substantially constant speed, the machine including reciprocating interacting package forming and sealing elements with support means acting simultaneously on the upper and lower side of the train of packages as they move through the machine. In an alternate arrangement, lids may be applied to package portions preformed by separate apparatus.

32 Claims, 14 Drawing Figures

Fig. 3A.
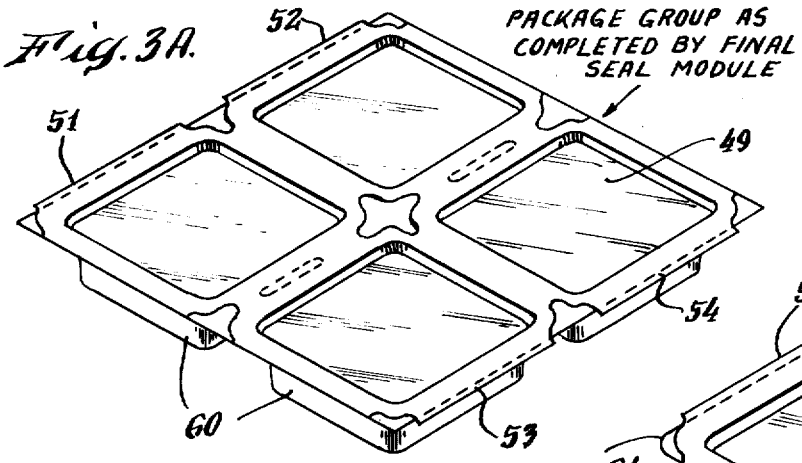
Fig. 3B.
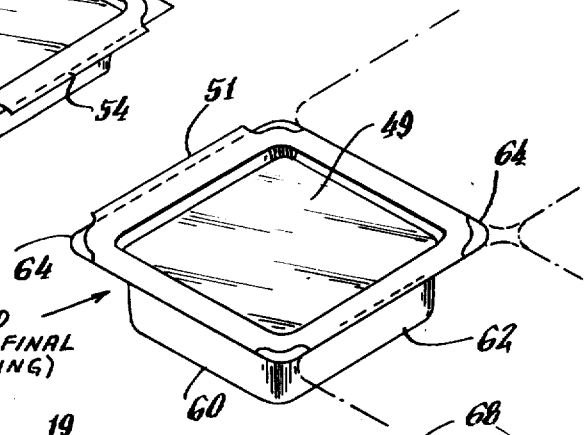
Fig. 5.
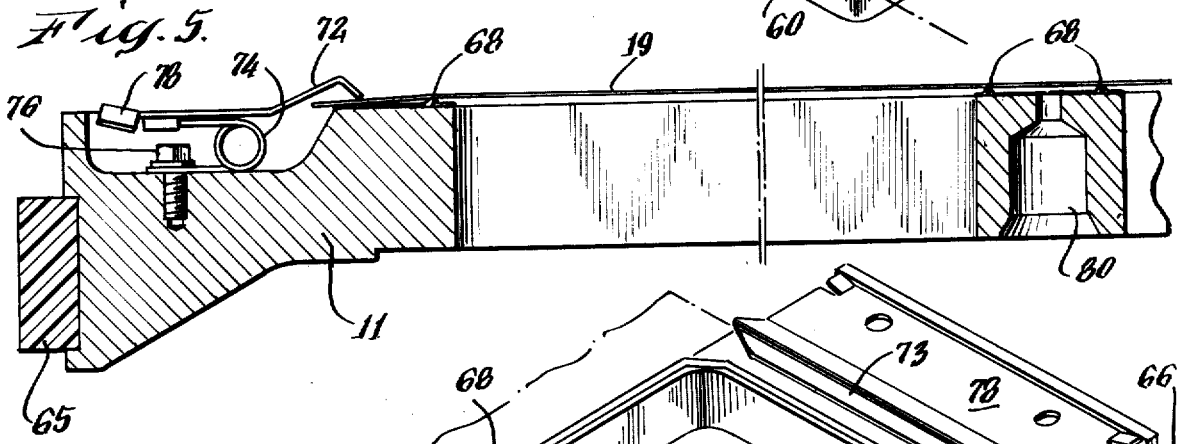
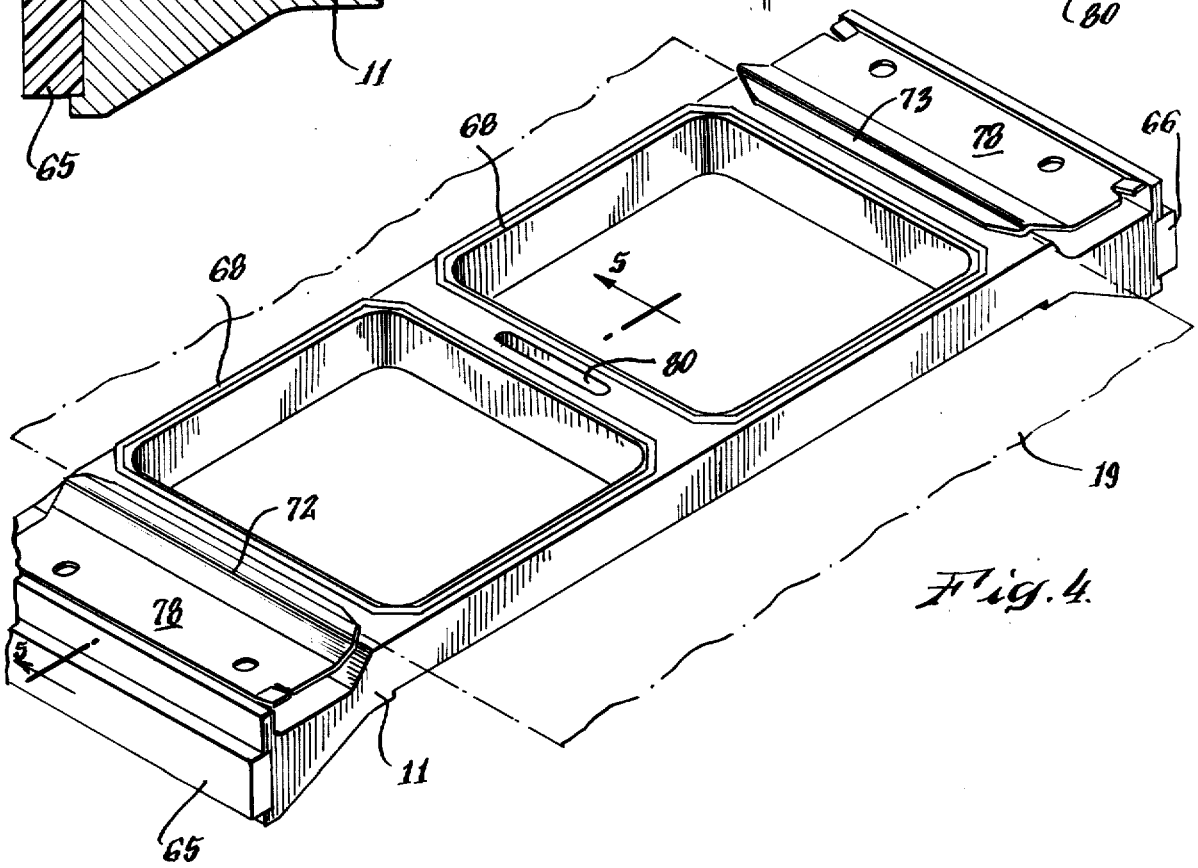
Fig. 4.

CONTINUOUS MOVEMENT PACKAGING MACHINE

Matter enclosed in heavy brackets [ ] appears in the original patent but forms no part of this reissue specification; matter printed in italics indicates the additions made by reissue.

This is a continuation of application Ser. No. 217,209, filed Jan. 12, 1972 *now Patent No. 3,958,394.*

BACKGROUND OF THE INVENTION

This invention relates to a packaging apparatus. More particularly, this invention relates to a method and apparatus for automatically forming a package from plastic packaging material, and sealing it to prevent the entry of oxygen and the like.

Prior art machines have certain known disadvantages. For example, in some packaging machines the product containers, typically tray-like package forms, are moved from station to station with an intermittent indexing motion, as in U.S. Pat. No. 3,061,984. Thus, all containers are alternately accelerated and decelerated, so that when such machines are used for liquid products, products containing large portions of nonviscous liquids or powdered products, the products tend to spill out of the container. Other machines, such as are shown in U.S. Pat. No. 2,935,828, employ a rotary drum which also introduces spillage problems. The present invention overcomes these disadvantages by moving the product container through the machine in an upright position in a horzontal plane and at substantially constant speeds, while the packaging operations are being performed.

U.S. Pat. No. 3,540,186 discloses a continuous movement machine which, however, fails to solve certain problems of considerable commercial importance. For instance that machine is incapable of forming the package parts and requires pre-manufactured containers for its packaging operation. Further, the construction of the support means for the tray carriers is such that the forces generated within the packaging mechanism are transmitted into the supporting structure which thereby necessitates the use of a generally heavier and more costly construction. An additional disadvantage is that the use of carriers with defined interior contours limits the shape of the packaging profiles which can be produced and/or used with the machine. Further in that regard, when it is desired to change the package profile, it is necessary to change or modify all of the tray carriers (sometimes numbering in the hundreds).

SUMMARY OF THE INVENTION

The present invention is directed towards providing a packaging machine of the continuous-movement type having important operational and constructional advantages. The bottom and top parts of the package may be formed in the machine, e.g. from rolls continuous plastic sheet. The package-forming components of the machine are mounted on a carriage which, for the operational portion of the machine cycle, moves at the same speed as that of the package parts. Thus, during each forming or packaging operation, the carriage and package parts are stationary with respect to one another. The carriage advantageously includes upper and lower frames upon which co-operative package-forming components are mounted. The upper and lower frames move the package-forming components against and into contact with the package parts, to perform the various packaging operations.

The thermoforming die, the package carrier and the packaging material when clamped together form an air-tight cavity under the packaging material which, when evacuated, will cause the heated packaging material to be drawn into the die. An insert, placed in the bottom of the die, controls the size and shape of the container so produced.

The upper web may be pre-punched for selected purposes, for example, so that in certain regions the top film will not extend out quite to the periphery of the flanges on the tray-like container (i.e. the package bottom). For some packages, e.g. those using preformed containers, the upper web may be cut so as to be within the periphery of the container at the corners, thereby providing a better appearance and facilitating the use of a snap-on cover.

It is a principal object of the present invention to provide a superior packaging machine capable of packaging a product while the package moves through the packaging machine at a constant rate of speed.

It is a further object of the present invention to provide an improved machine of the type which will form the product container, as well as seal it.

An additional object of the present invention is to provide apparatus which can readily be altered to produce packages of differing shapes.

A further object of the present invention is to provide apparatus which will perform forming and/or packaging operations without requiring costly and complex support mechanisms.

A still further object is to provide packaging apparatus that is economical to manufacture and operate, reliable in use, and easy to service. Other objects, aspects and advantages of the invention will in part be pointed out in, and in part apparent from, the following description considered together with the accompanying drawings.

BRIEF DESCRIPTION OF THE DRAWINGS

FIGS. 3A and 3B are perspective views of a package which may be produced by the packaging apparatus in FIGS. 1 A and 1 B;

FIG. 4 is a perspective view of a carrier with the plastic packaging material clamped thereto;

FIG. 5 is a sectional view of the carrier of FIG. 4 which has been sectioned along the line 5—5 of FIG. 4;

DESCRIPTION OF THE PREFERRED EMBODIMENT

Figure 1A:
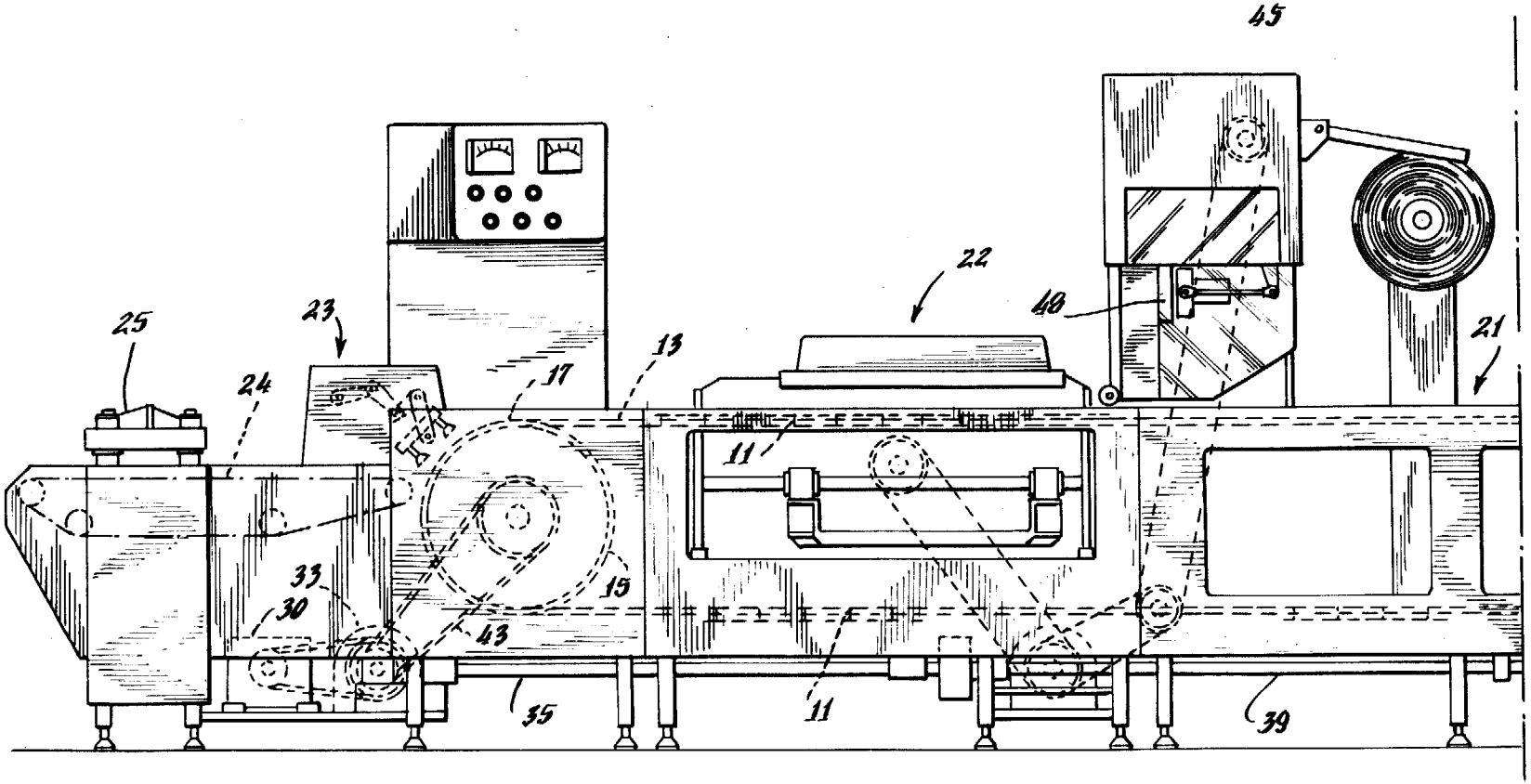
FIGS. 1 A and 1 B are front elevational views of the packaging apparatus in which FIG. 1 A represents the downstream portion of the packaging apparatus and FIG. 1 B represents the upstream portion of the packaging apparatus with the apparatus being sectioned on line A—A.
Figure 1B:
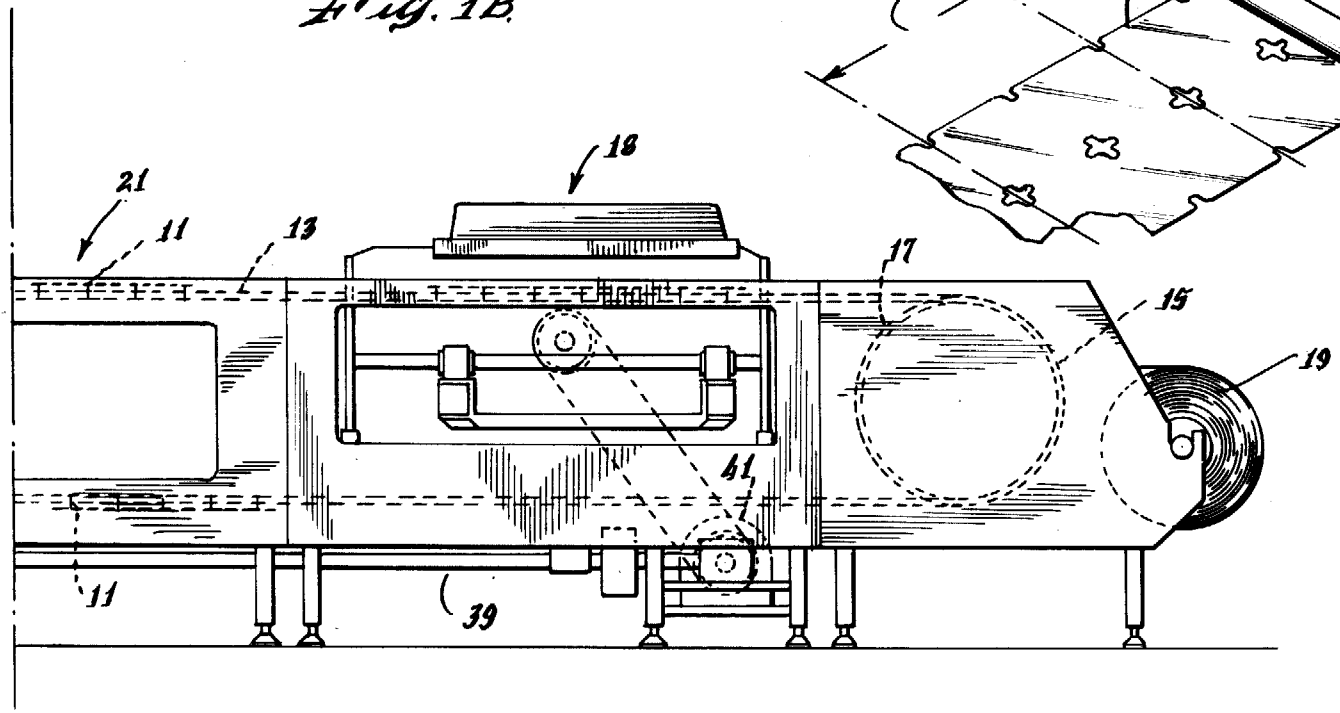

As shown in FIGS. 1 A and 1 B, the machine includes a set of open package carriers 11 arranged in an endless loop for movement at constant speed. These carriers move from the right to the left of the machine on the working or upper level and from left to right on the lower or return level. The carriers are supported by guide means and are moved by a pair of endless chains 13 and 14 driven by the usual sprockets 15 and 17.

The machine also includes a thermoforming module 18 (see also FIG. 6) in which a lower web of the packaging material 19 is formed into a series of product containers. The plastic packaging material 19, mounted in a roll at the right-hand side of the machine, is applied against the carriers 11 and is gripped at its edges by clamps (see FIGS. 4 and 5) located on each carrier. These clamps are held closed by springs which are opened again at the extreme left-hand or downstream side of the machine for removal of the package. In operation, the carriers 11 with the packaging material 19 held thereon are moved into the forming module wherein the web is first heated, and thereafter thermoformed into the package container.

The containers so formed move from the forming module 18 into the product loading area 21. In the product loading area, the product is loaded into the carriers by any known means, such as by hand or by machine (not shown). Thereafter, the carriers 11 with the product positioned therein move into a final seal module 22.

The final seal module 22 performs the following functions: initial seal and heat, top web forming, evacuation, final seal, and cross-cut. The carriers 11 move the completed package to the package pick-off mechanism 23 whereby they are placed on a conveyor 24 for transfer to the package post-trim section 25 where the package is trimmed to size. Package pick-off 23 and package post-trim 25 are of conventional designs known in the art and will not be further discussed herein.

All operations are preformed by the packaging machine while the carriers move at a substantially uniform rate of speed through the packaging system. Synchronization between the functions of the several units and the movement of the conveyor is obtained by providing a common drive for the conveyor and for the mechanisms which move the operating units. The drive train, which is shown in FIGS. 1 A and 1 B, includes motor 30, gear box 33, drive shaft 35, gear box 37, drive shaft 39 and gear box 41. Sprocket 15 is inerconnected with gear box 33 by interconnecting means 43 which, in the preferred embodiment, is a chain drive. Belt drives and the other similar drive means which are well known in the art, may be utilized. Similar interconnecting means connect the sealing module 22, and pre-punch module 45 and the forming module 18 with the drive train.

Figure 2:
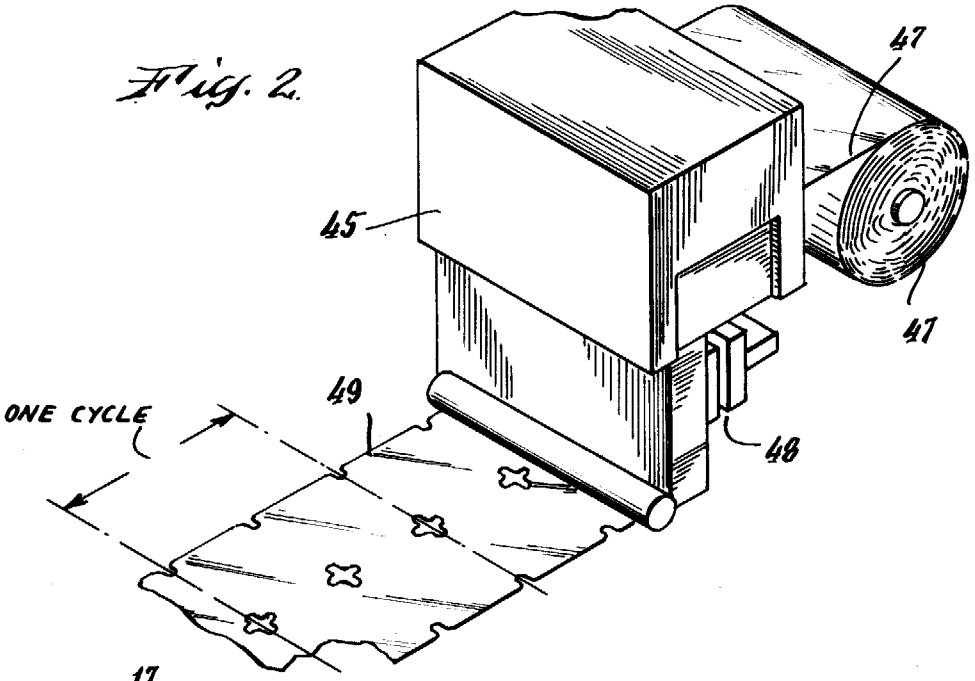
FIG. 2 is a perspective view of the top web prepunch unit and a portion of pre-punched top web which can be produced by this unit.

The pre-punch module 45 is shown in greater detail in FIG. 2. Flexible packaging material 47 is drawn into the pre-punch module through punching press 48 and thereafter is transferred to the sealing module 22 to serve as the tops of the packages being produced. The top web 49 may be pre-punched for various purposes, depending on the type of package to be produced. For some packages the top web may be pre-punched so as to provide rounded corners which may lie within the profile of the bottom web which will be cut thereafter. When used with pre-formed containers having rounded corners, pre-cutting of the upper web to be within the periphery of the corners of the container provides a better appearance by eliminating wrinkling of the upper web, and facilitiates the snapping on and off of a removable cover (not shown) which may be added after the package is otherwise completed. Portions of the top web may extend past the periphery of the lower web to provide a readily accessible tab which may be pulled by the user for the purpose of opening the package.

As shown in FIG. 2 and as considered throughout this disclosure, one cycle of operation includes four packages arranged in a square-like configuration. It is recognized that many configurations with various numbers of packages being formed can be used in the practice of the present invention.

The plastic material is continuously supplied to the sealing module 22 by the pre-punch module which includes draw rolls driven by, and in synchronism with, the machine proper. Registering apparatus is included for registering the top web in accurate alignment with the bottom web. The pre-punch module includes the punching press 48 and an arresting device of conventional design for momentarily arresting the forward continuous movement of a portion of the web while it is being punched.

A package formed by the disclosed apparatus is shown in FIG. 3A and includes a top 49 and a bottom or product container in the form of a tray-like receptacle or cup 60. It will be noted that the apparatus of the present invention produces a package in which the central face of the top is forced downwardly to extend into the opening of the bottom 60 and press against the upper surface of the product. This forming of the top is effected by thermoforming prior to evacuation and final sealing of the package. After the packaging is evacuated, the top is pushed down against the product by atmospheric pressure. This arrangement is particularly advantageous for a number of reasons, e.g. it readily accommodates products of varying thickness. Further details of this procedure and concept are set forth in U.S. Pat. No. 3,545,163.

The top 49 may be formed from flexible, thermoformable plastics such as a composite of nylon and saran with a polyethylene seal coating. The receptacle may be formed from semi-rigid plastics such as polyvinyl chloride with a sealing coating of polyethylene. The receptacle may, however, be constructed from flexible plastic similar to that used for the top.

As is shown in FIG. 3B, the product-receiving portion 62 of the receptacle 60 is in a substantially rectangular shape; and a flange 64 provides a sealing surface against which the top web can be sealed. This flange rests upon the carrier 11 so as to support the receptacle in the carrier during the packaging operation.

Figure 8:
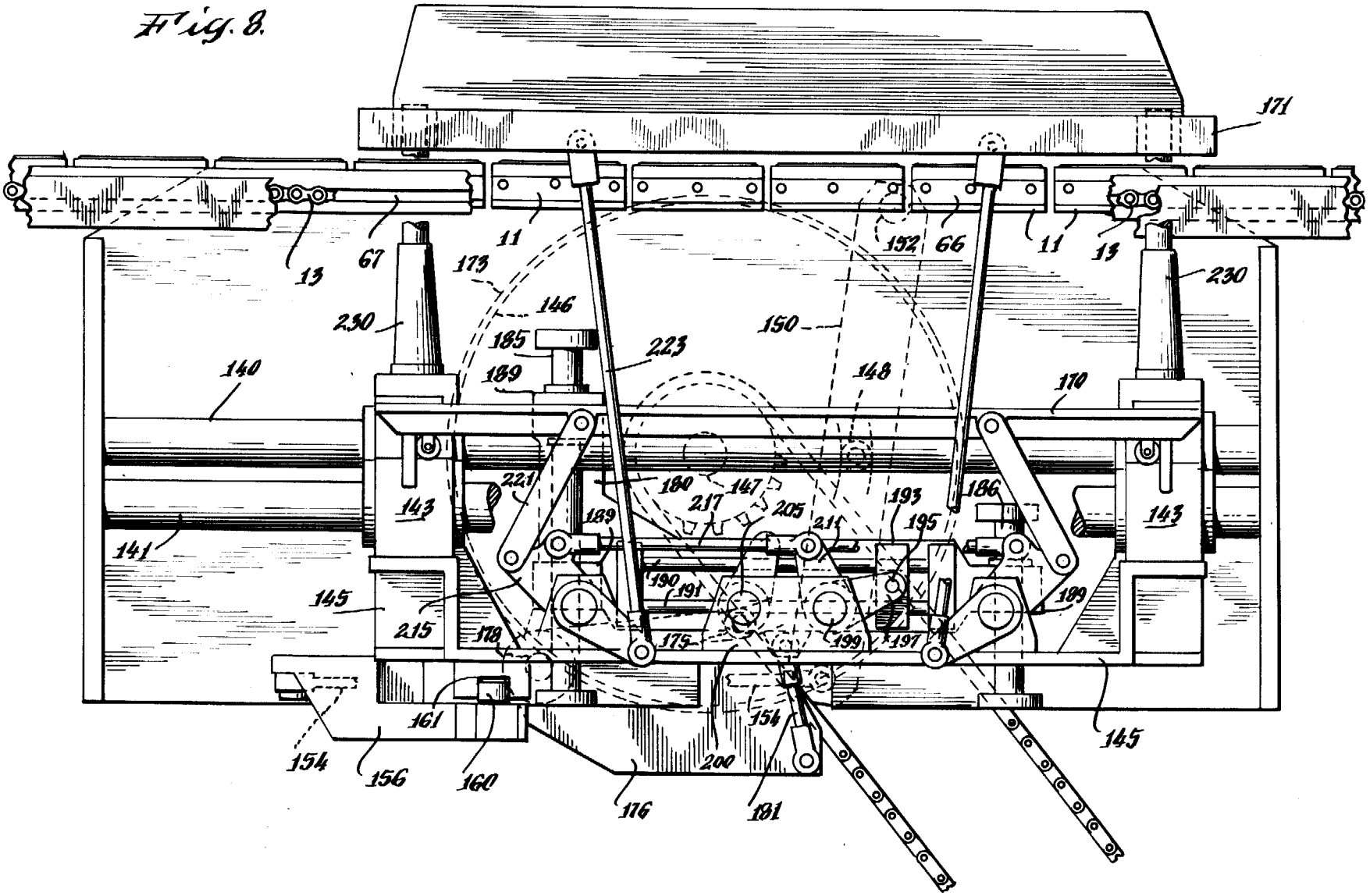
FIG. 8 is a front elevational view of the carriage utilized by the thermoforming section and seal module of FIGS. 4 and 5, respectively.
Figure 9:
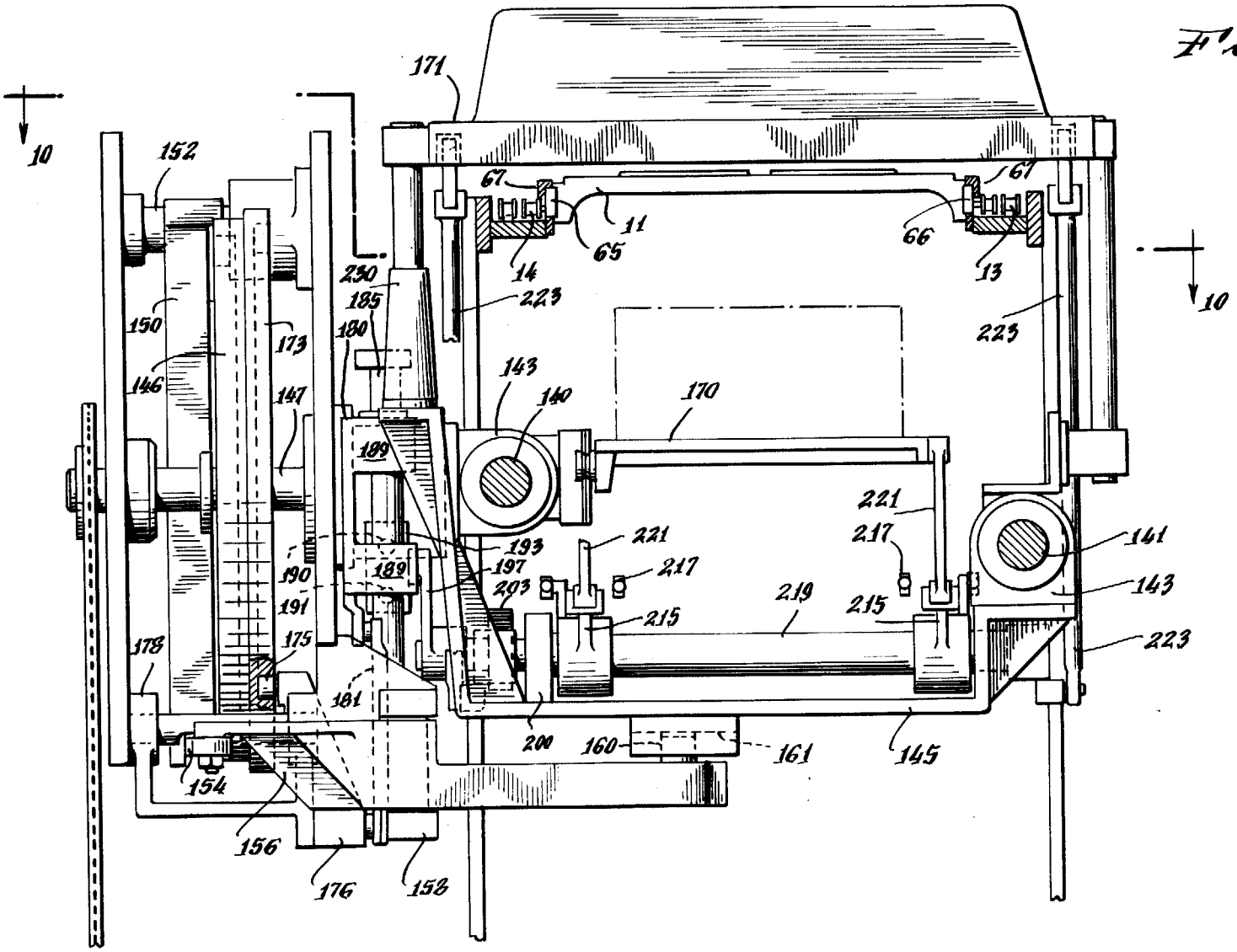
FIG. 9 is a side elevational and partial sectional view of the carriage of FIG. 8 which has been sectioned along the line 9—9.
Figure 10:
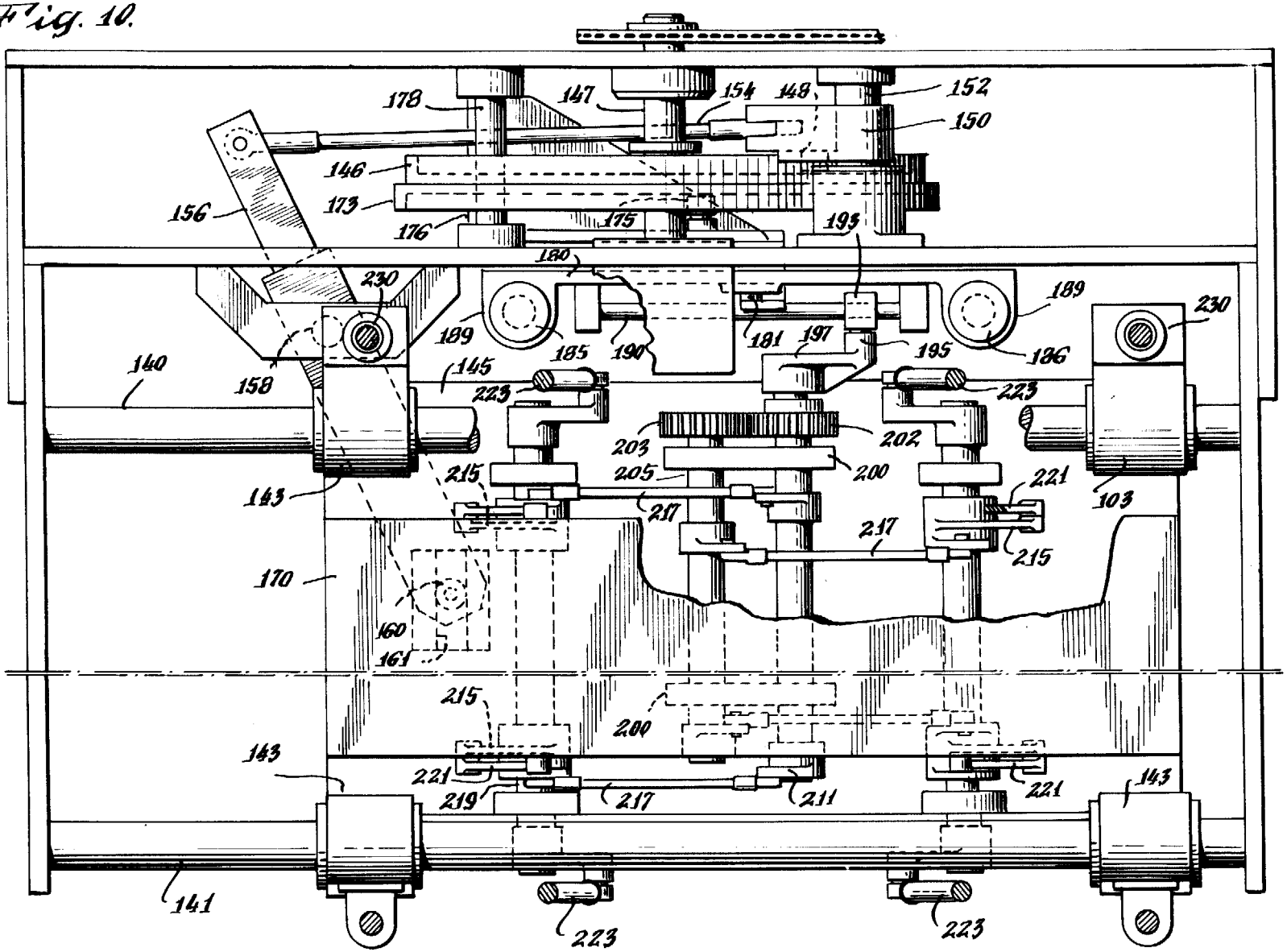
FIG. 10 is a plan and partial sectional view of the carriage of FIGS. 8 and 9.
Figure 11:
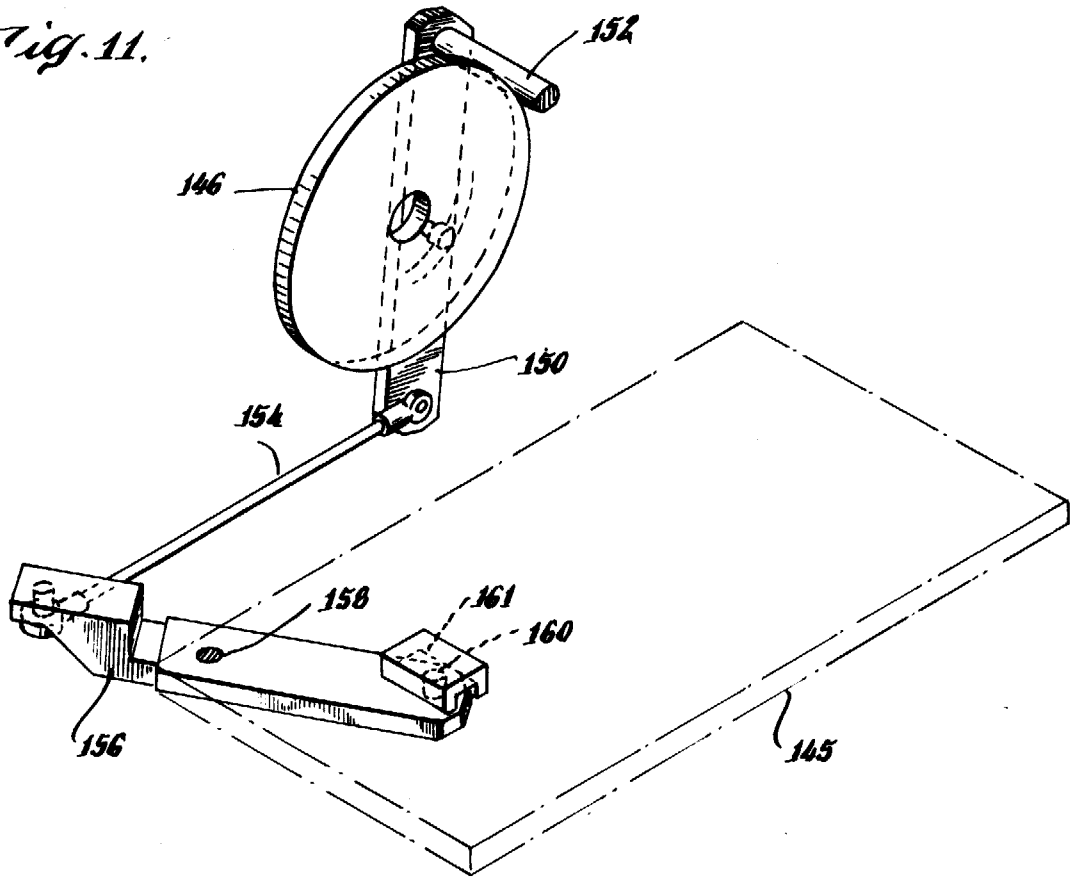
FIG. 11 is a schematic view of the mechanism for producing the horizontal motion of the carriage assembly shown in FIGS. 8–10.
Figure 12:
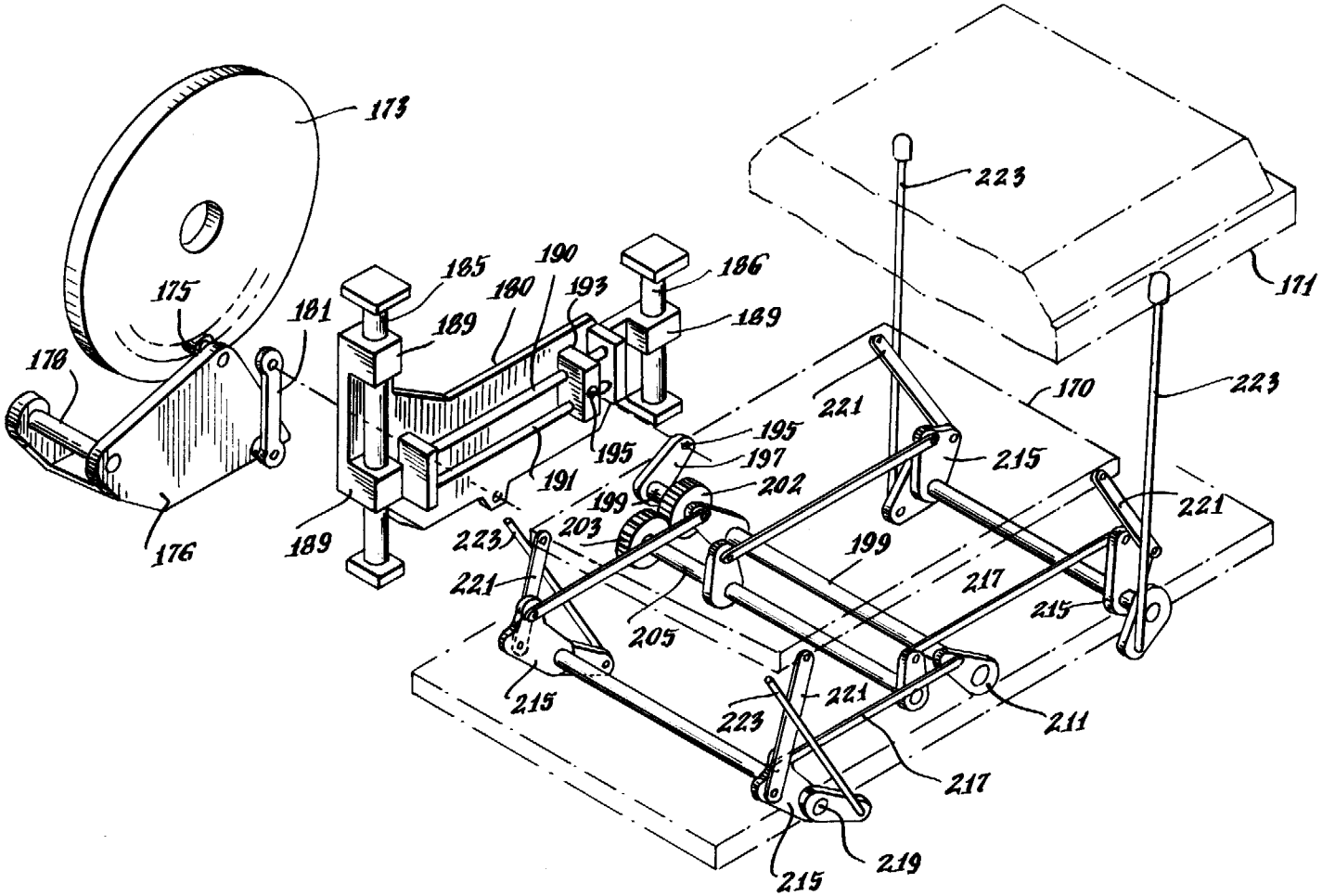
FIG. 12 is a schematic view of the mechanism for producing the vertical motion of the carriage assembly shown in FIGS. 8–10.

Carrier 11 is shown in greater detail in FIGS. 4 and 5, and includes support means or guides 65 and 66 which are designed so as to slide in a channel 67 (see FIGS. 8 and 9) on the working level of the machine. Endless chains 13 and 14 (see FIG. 8) interconnect through the guides to move the carrier. As shown herein, the carrier has two side-by-side forming cavities and is referred to as a "bottomless" carrier; that is, the cavities in the carrier extend through the carrier.

As assembled on the machine, the carriers 11 are closely adjacent to one another. Two carriers, with four side-by-side forming cavities, define one operating set and are arranged in a square-like pattern and constitute one operating cycle, that is, each forming or packaging operation is simultaneously performed on those four forming cavities.

A molded-on-gasket 68 extends around the periphery of each cavity, and acts in sequence both as a heat sealing cushion and as a vacuum seal. Clips 72 and 73 on the carrier 11 clasp the plastic packaging material and hold the plastic in contact with the carrier while the thermoforming, filling and sealing operation are performed. As shown in FIG. 5, clip 72 is mounted upon biasing means 74 and the assembly is attached to the carrier with fastening means 76. The clip 72 will release the plastic packaging material at the end of the working level of the machine when lever 78, attached to clip 72, is depressed. Thereafter, the formed packages are removed from the carriers.

An additional cavity 80 is provided in the carrier to provide access for a web lifter to lift the top web above the bottom web during the evacuation and final seal operation, functionally like the arrangement shown in U.S. Pat. No. 3,061,984. In the present arrangement, however, the web-lifters are not provided in the individual package cariers, but instead two such web-lifters are located at the sealing module to operate with each set of packages as they pass by. The bottom web may be pre-cut with a slot for passage of the web-lifter to engage the top web.

Figure 6:
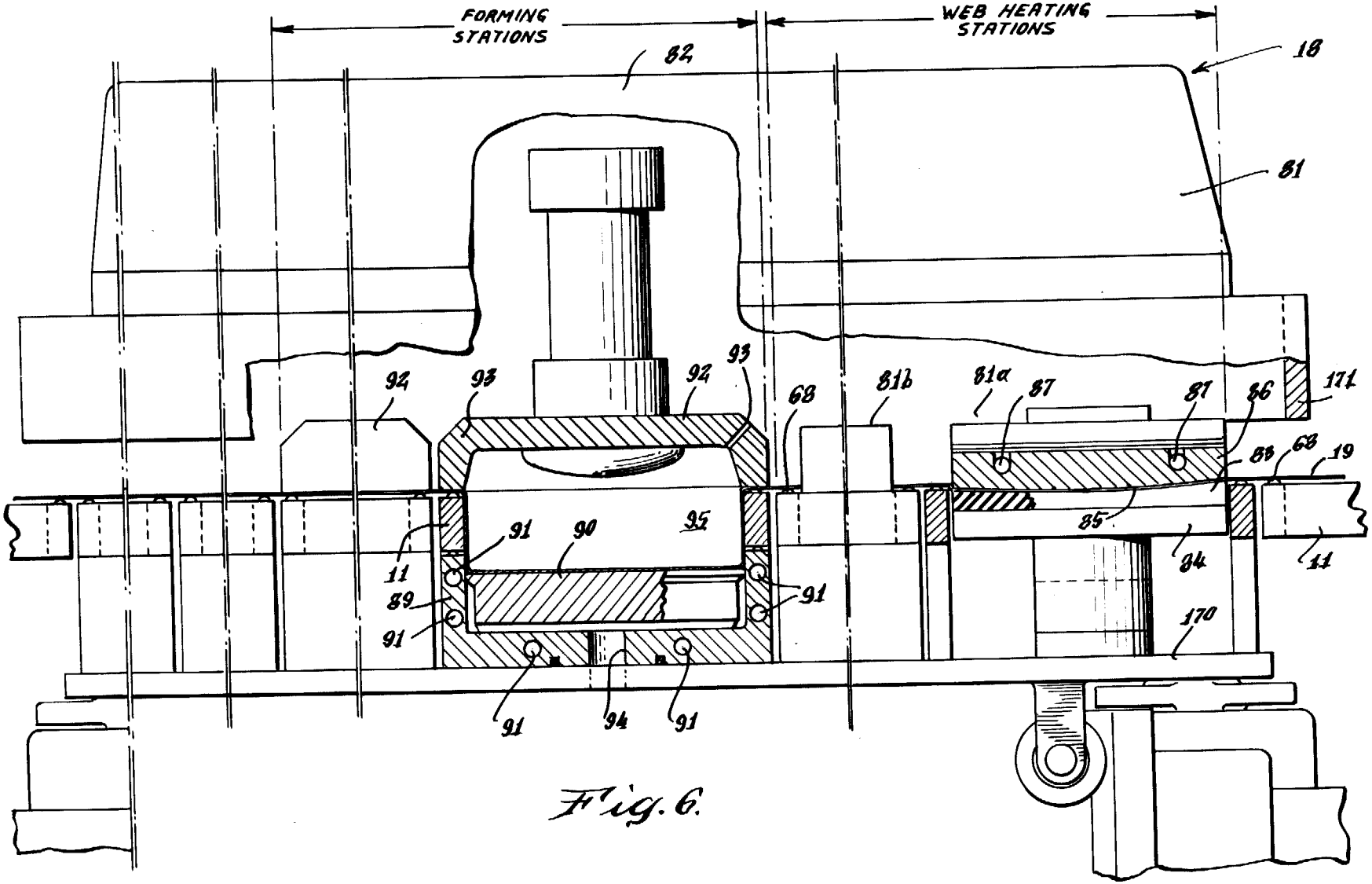
FIG. 6 is a front elevational view of thermoforming section of the apparatus of FIG. 1.

FIG. 6 provides a front elevational and partial cross-sectional view of the thermoforming module of the apparatus of FIG. 1. With reference to FIG. 6 it will be noted that the lower web material 19 has been unwound from the supply roll and is held in position on the carrier 11 by clips 72 and 73 (shown in FIGS. 4 and 5). The continuously moving carrier moves the packaging material into the thermoforming section 18.

The thermoforming section 18 includes a web heat station 81 and a forming station 82. The web heat section includes four units 81a, 81b, 81c, and 81d, only one of which is described herein, the other units being the same except for location. Heat unit 81a includes sponge 83 mounted upon pedestal 84 which in turn is mounted upon lower frame 170. The sponge preferably has a Teflon coating 85 on its working surface. The width of the sponge and its pedestal is such as to pass through the openings of carriers 11 to contact the plastic material which will be thermoformed.

A heated plate 86 is mounted on the upper frame 171. This plate is made with a convex surface to assist in eliminating air bubbles, and resultant unheated spots, from the interface of sponge 83 and heated plate 86. Heater elements 87 are distributed throughout the internal portion of the heated plate 86.

In a typical machine cycle of a module (either forming or sealing), the total motion comprises a vertical motion of the upper and lower portions in opposite directions, and horizontal motion of both portions in the same direction, at the same speed. In general, with reference specifically to frames 170 and 171, the upper and lower portions of the module close upon, travel with, and retract from the carriers 11 that are traveling at a constant velocity in a horizontal direction.

Beginning arbitrarily at the convenient point of 40° into a cycle (a complete cycle having 360°), the upper and lower portions of the module are fully clamped to the carriers 11 and the entire unit is traveling at a constant velocity in a horizontal direction. This motion continues until 210° into the cycle. During this time the working devices are in operating position performing the special package-making functions.

After 210°, and while still moving horizontally, the upper and lower portions of the module separate vertically, in opposite directions, away from the carriers 11. Full or maximum separation is achieved at a cycle time of 270°. During the time required to reach full separation, the horizontal velocity is slowed to zero and a reversal of horizontal direction takes place, with the module portions returning to their full retracted horizontal position at 350° into the cycle. Ten degrees earlier (at 340°) the closing vertical motion of the upper and lower portions had started, with both moving towards the carriers. This closing motion continues until 40° into the next cycle, at which point the module portions are fully engaged for the next operations. The horizontal motion given to the module portions from 350° to 10° into the new cycle is an acceleration in the direction of the carriers until the velocity of the carriers is matched so that clamping and packaging work can be performed.

In the embodiment shown herein, the heating is applied to two carriers 11 in each cycle. It should be recognized that heat could be applied to only one carrier, or to more than two, to meet special requirements. Further, more than one heat cycle could be used if appropriate.

The heated packaging material passes to the forming station which again consists of four units (only two of which are shown in FIG. 6, the other two being directly behind). Only one unit will be described in detail because, with the exception of position, the other units are exactly the same. This unit comprises a thermoforming die 89 mounted upon frame 170 in such position as to register with the openings in carrier 11. The thermoforming die may be of such a construction that it will pass through the openings of carrier 11 or it may be constructed so that the die will approximately match or project slightly inside the openings in the carriage 11. With either construction, each die cavity may be equipped with an insert 90 which may be replaced to change the depth or configuration of the package portions being formed. As shown herein, four forming units constitute the forming station, and thus to change the form of the packages only the insert 90 in each of the four forming units need to be changed. The forming die 89 is advantageously equipped with water passages 91 for cooling water to cool the thermoformed material in a semi-rigid state.

The upper die 92 presses down towards the carrier 11 and holds the packaging material 19 between the carrier and the die on the gasket of the carrier. The interior of the upper die is exposed to the atmosphere through vent holes 93.

The thermoforming die 89 and the upper die 92 are moved together so as to clamp the carrier 11 and the packaging material 19 between the two dies. An airtight chamber is formed by the lower die 89, the carrier 11 and the lower surface of the packaging material. A vacuum is applied to chamber through opening 94 and the plastic packaging material is pushed down, by air pressure, into the die cavity and against the insert 90.

The cooling water passing through water passages 91 cools the packaging material so that its dimensions and shapes are fixed to approximately the dimension and shape of the die 89 and insert 90. With the bottom web formed, the dies separate and the carrier in which the bottom web is mounted moves to the product filling station 21 (FIG. 1).

Figure 7:
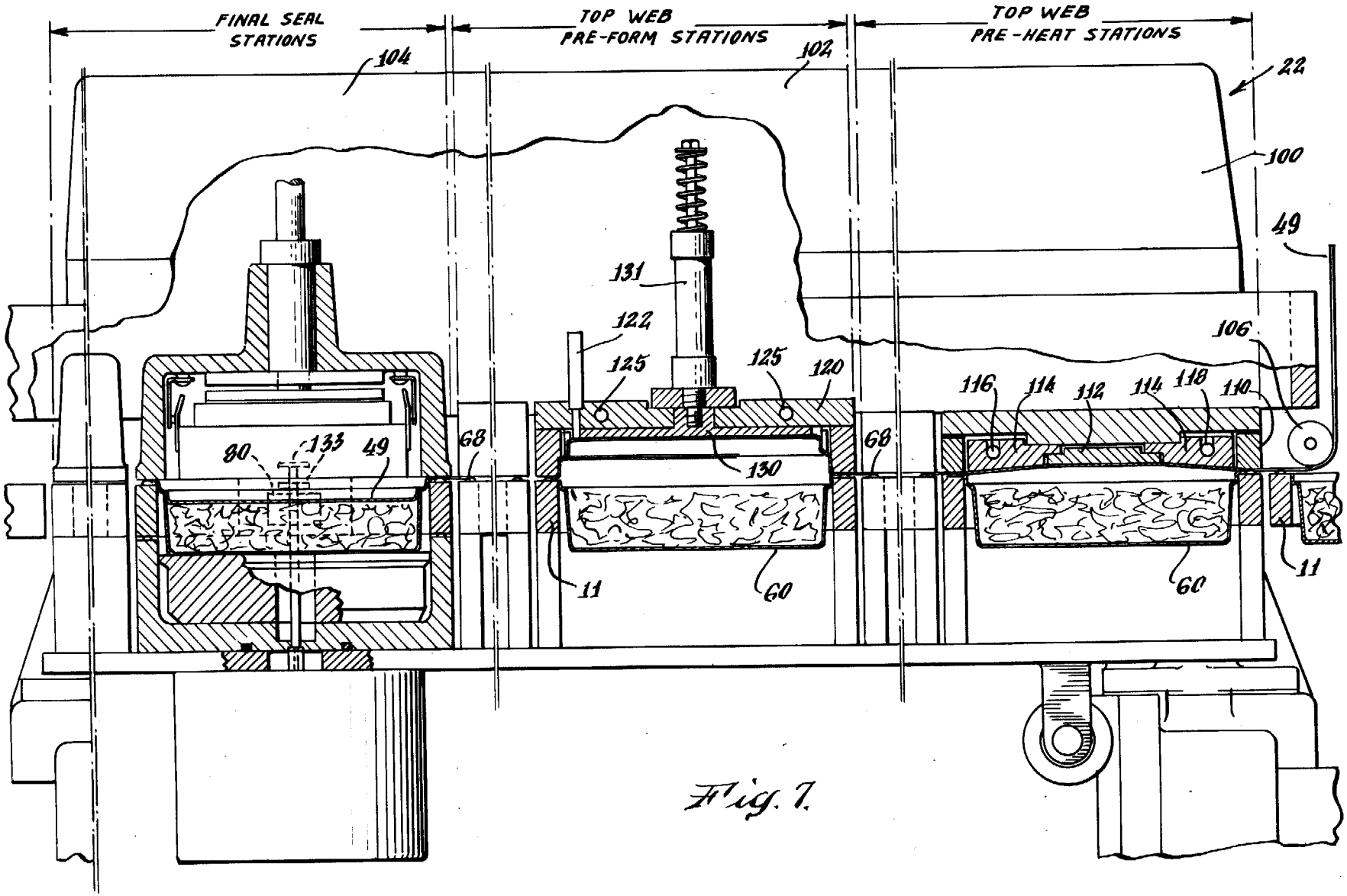
FIG. 7 is a front elevational view of the final seal module of the apparatus of FIG. 1.

Referring now to FIG. 7, the module 22 includes a top web heat and initial seal station 100, a top web forming station 102, and a final seal station 104. At a position just preceding the top web heat and initial seal station 100, a thin film of flexible and stretchable plastic packaging material is applied over the carriers 11 by lay down roller 106. Because of the registering apparatus in the pre-punch module, discussed heretofore, the top web is accurately aligned with the bottom web.

The top web heat and initial seal station includes a sealing die 110 which is provided with conventional heating elements to heat the sealing surfaces of the die to a relatively high temperature. These sealing surfaces act as heat sealing bars to heat seal the top web to the lower web portion which will be the package flange 64. The sealing die 110 seals the entire periphery except for a small portion thereof, which will be completed at the final seal station.

Shortly after the heat-sealing die 100 reaches its engaged position, a vacuum is applied to the interior chamber of the sealing dies by means of a vacuum line (not shown). The resulting pressure differential across the surface of the top web forces the top web up and into contact with the horizontal surface of the thermally-insulated member 112 which is centrally positioned within the corresponding carrier cavity. Surrounding each of the central members 112 and physically isolated therefrom, are inclined roof segments 114 against which the film is forced by the pressure differential created by the vacuum. These roof segments are heated to an elevated temperature by the electrical heater elements 116 and 118 which are embedded therein. The roof 114 serves to transfer heat to the marginal portions of the film surrounding each central member 112, that is, around the region adjacent inner periphery of the receptacle. The heating serves to soften the thermoformable plastic of the top web for the subsequent stretching operation to be performed thereon.

The top web is stretched by the top web forming station 102 in which forming die 120 moves against the carrier 11 and into contact with the seal areas thereof so as to engage the top web which has been sealed to all but a portion of the periphery of the flange 64 of the receptacle 60. Thereafter, the interior chamber of this die is evacuated by vacuum line 122 and the resulting pressure differential on the plastic film 49 stretches the top web against the upper roof of the die. The roof of the die 120 defines two cavities each having a shape conforming generally to the shape of the package. The flexible top web in the forming die has a shape similar to that which it will attain when it ultimately is inverted into the receptacle.

The stretching of the film of the top web forming station 102 is carried to a permanent-set dimension, i.e., beyond the elastic limit of the plastic film, and the stretched plastic is cooled by its contact with the roof of the chamber so that its dimensions and shape are fixed to essentially the dimensions and shape of the die 120. The central face of the film will not be stretched significantly if the central member 112 in the top web heat and initial sealing station 100 is cooled, but it would be stretched somewhat more if central member 112 were heated. The forming die 120 preferably is cooled as by means of a conventional water cooling conduits 125 so as to reduce the temperature of the die walls and thereby hasten the forming operation.

When the forming operation is complete, the vacuum in the sealing die 120 is vented and the upstanding cap-like elements of the formed top web are flexed down into the receptacles of the bottom web, as shown in the final seal station 104. To shift the top web to its final position, the plunger 130 operated by conventional air cylinder 131 pushes the plastic film of the upper web down into the cavity of the bottom web. The downward movement of the plunger forces the stretched film into position loosely in the bottom web carrier.

The evacuation and final seal process is conducted in the final seal station 104. The final seal station includes a web lifter 133 which functions in a manner described in U.S. Pat. No. 3,061,984. During the final seal operation, this web lifter is moved up through the hole 80 in the carrier 11, and passes through an aligned slot previously cut in the bottom web 19, to engage and raise the flexible top web a sufficient distance above the surface of the bottom web to create a suitable evacuation passage into the interior of the bottom web 60. The final seal dies are fully closed to establish an air-tight chamber for the packages. Thereupon, the packages are evacuated in known fashion. After the evacuation has been completed, the web lifter 133 drops away and that portion of the package periphery that was not sealed in the initial seal station now is sealed by the final seal bar, i.e. adjacent to the center member of the carrier.

The top web heat and initial seal station 100, the top web pre-form station 102 and the final seal station 104 are all mounted upon movable frames 170 and 171, and the operating elements of each station, although performing different functions, are subjected to the same movements because they all move with the frames. Three cycles of operations are performed on each carrier as it passes through the sealing module.

The motion of the carriage 145 is the same for all three operations of the sealing module, that is, in each case the carriage accelerates up to the carrier speed, and then moves at the same rate of speed as the carriers. The frames upon which the forming and sealing machinery are mounted are brought into contact with the carrier and the appropriate operation is performed. When the operation is complete, the frames separate and the carriage returns to its initial position to again repeat the cycle.

The carriage mechanism generally illustrated in FIGS. 8–12 is used for both the forming module and the sealing module. This mechanism includes two stationary rods 140 and 141 on which the carriage 145 is mounted slidably by four bearings 143 which are attached to the carriage. The carriage is driven horizontally back and forth in synchronism with the machine. In more detail, the motion-producing elements include a cam 146 mounted upon a shaft 147 which is driven at the rate of one revolution per cycle by conventional means. The track of cam 146 engages a follower 148 which is mounted to a lever 150 the upper end of which is attached to the stationary machine frame on shaft 152. At the lowermost extreme of lever 150 is a linkage 154 which directly connects themmotion of lever 150 to that of lever 156. Linkage 154 connects with the end of lever 156 which is pivotally attached to the machine frame (not the carriage) at pivotal point 158 and carries cam follower 160 at its outer extremity. Cam follower 160 engages cam follower track 161 of carriage 145. Thus, as cam 146 is rotated, the carriage 145 is driven positively backwards and forwards through lever 150, linkage 154 and lever 156. For each rotation of the cam 146, the carriage 145 moves through one complete horizontal movement cycle.

The vertical motion and the carriage 145 is accomplished by frames 170 and 171 moving in the vertical direction. Mounted upon shaft 147, and as shown in the drawings FIGS. 8–10 and 12, cam 173 is concentric with cam 146 and provides the vertical motion to the lower frame 170 and the upper frame 171. Cam 173 engages cam follower 175 which is mounted on the upward end of lever 176 which in turn is pivotally connected to the machine frame at 178. With the rotation of the cam 76, cam follower 175 moves lever 176 to pivot about point 178 in the vertical slide 180 through link 181. Vertical slide 180 is mounted upon three bearings 189 which are engaged with two bearing engagement rods 185 and 186 which permit the vertical slide to slide only in the vertical direction. Mounted upon vertical slide 180 are two parallel guide rods 190 and 191. Mounted upon the two parallel guide rods is slide 193 which is adapted so as to be able to slide horizontally along the parallel guide rods 190 and 191. Slide 193 is pivotally connected at the point 195 to lever arm 197 which is mounted upon shaft 199. Shaft 199 is rotatably supported by bearings 200 which are mounted upon the carriage 145. The gear 202 mounted on shaft 199 is engaged with an identical gear 203 which in turn is mounted upon shaft 205. It will be noted that shaft 205 and shaft 199 are interconnected through gears 202 and 203 and are parallel to one another. Thus, as the lever arm 176 is pivoted about point 178 by cam 173, linkage 181 causes vertical slide to move in the vertical direction which thereby causes slide 193 mounted upon parallel guides 190 and 191 to slide in the horizontal direction imparting a rotary motion to lever arm 197 turning shaft 199 and 205, through gear 203, in the opposite direction. Thus, as the cam 173 moves through one revolution per machine cycle, shafts 199 and 205 are driven in opposite directions. The movement of the shafts 199 and 205, it will be noted, is independent of the horizontal position of the carriage 145 within its normal working range.

As the mechanism which moves the upper and lower frames 170 and 171 in the vertical direction is symmetrical, a discussion of only one portion of the linkage will be described as those skilled in the art will readily recognize that such linkage which is used for supporting and moving the frames together is the same throughout the machine. Lever 211 which is connected with shaft 199 moves with shaft 199 and for illustrative purposes herein, shaft 199 moves lever 211 in the clockwise direction. Lever 211 is connected with bellcrank 215 by a linkage 217. Bellcrank 215 pivots about the points 219 located on the carriage. Thus, when lever 211 moves in a clockwise direction, bellcrank 215 will pivot about 219 in a clockwise direction. One leg of bellcrank 215 is connected through linkage 221 to lower frame 170. The other end of bellcrank 215 is connected through linkage 223 to the upper frame 171. Thus, as the shaft 199 moves in the counter-clockwise direction, bellcrank 215 pivots about pivot point 219 in the clockwise direction causing linkage 221 to raise frame 170 in the vertical direction. Likewise, linkage 223 lowers frame 171 in the vertical direction. Thus, as shaft 191 is rotated for a portion of its travel, lower frame 170 is directed upwardly and upper frame 171 is directed downwardly in a clamping motion. Thereafter, shaft 199 reverses its direction and the upper and lower frames reverse direction.

It is to be further noted that support means 230 are slidably engaged with the upper frame 171 and serve to keep the upper frame accurately aligned with respect to the lower frame 170.

The equipment mounted upon frame 170 and 171 may exert large forces against the carriers 11, due to heat sealing forces, vacuum, gas pressures and the like. By using opposed (top and bottom) packaging components which are forced together against the bottomless carriers, the resulting mechanism serves in the nature of a vise, to develop large forces internally without creating correspondingly large reaction forces in the support structure. Thus the supporting structure need not be constructed of heavy, large-gauge elements, as would be the case if the packaging components were of a single-sided arrangement, as in a conventional press construction. The advantages of the invention in this regard will be achieved also where the packaging material is held by chain-clip, i.e. without any carriers.

Although the principal embodiment described hereinabove advantageously incorporates open-framework carriers 11 for transporting the packaging material through the various sequential operating states, it is important to recognize that certain aspects of the present invention do not require such carriers. More particularly, for some applications, the packaging material could be supported by known types of removable chain-clips which grip the side edges or margins of the continuous strip of packaging material to be formed into cup-like receptacles. The thermoforming module described above could be used for this purpose with only relatively minor modifications. Similarly, the sealing module could be used, with only minor modifications, to heat-seal the tops to the receptacles, and to evacuate the packages where appropriate. Moreover, it will be evident that the package receptacles could be transported by conventional trays, as shown in U.S. Pat. No. 3,061,984, in which event the lower portions of the forming and sealing modules could be modified so as to support the trays during the cycle.

If the packaging apparatus utilizes either conventional trays, or the preferred open-framework carriers described herein, the package receptacles can be supplied as so-called "pre-form", i.e. cup-like receptacles formed previously on another machine. In that event, the thermoforming module would not be needed, although of course the sealing module would still be required for the various sealing and/or evacuation procedures required.

It also should be understood that the packaging apparatus described herein can be used not only to evacuate the packages, but also to supply an inert gas to the packages, depending upon the nature of the product. Such gas can readily be supplied through internal passages in the weblifter, as described in U.S. Pat. No. 3,061,984. For some applications, it may be unnecessary either to evacuate the packages or to supply them with gas; that is, the apparatus can be arranged simply to seal the top film directly to the receptacle flanges, without the described intervening steps incident to evacuation.

Although specific embodiments of the invention have been set forth in detail, it is desired to emphasize that this is not intended to be exhaustive or necessarily limitative. On the contrary, the showing herein is for the purpose of illustrating the invention, and thus to enable others skilled in the art to adapt the invention in such ways as meet the requirements of particular applications, it being understood that various modifications may be made without departing from the scope of the invention.

We claim:

1. In packaging apparatus for making sealed packages of the type including a product-containing receptacle and a top sealed to the receptacle around the periphery thereof; said apparatus comprising:

conveyor means including support means arranged to engage packaging material and to transport it along a horizontal path at substantially constant speed to permit sequential packaging operations to be performed thereon;

said support means including means to fixedly hold said material longitudinally immobilized relative to said conveyor means;

operating means comprising first and second means respectively above and below said path of movement with at least one of said means being arranged to reciprocate vertically towards said path into pressure-engaged operative position with the other means effectively embracing portions of said packaging material with viselike pressure while performing packaging operations thereon; and reciprocating means to move both said first and second means horizontally together at a speed matching that of said product-containing receptacles while said operating means is in said operative position.

2. Apparatus as claimed in claim 1, wherein said conveyor means comprises a plurality of open-framework carriers presenting bottomless cavities through which the receptacle bodies can extend, the carrier members surrounding said cavities serving to engage receptacle flanges and thereby to support the receptacles suspended therefrom.

3. Apparatus as claimed in claim 1, wherein said first and second means comprise thermoforming means above and below the packaging material;

said thermoforming means including means to heat the packaging material and to stretch portions thereof to present cup-shaped cavities.

4. Apparatus as claimed in claim 3, wherein said thermoforming means comprises a lower die to form a web of packaging material into product-containing receptacles; and a receptacle insert in said lower die to control the receptacle depth and shape.

5. Apparatus as claimed in claim 1, wherein said first and second means comprises sealing means to heat-seal packaging material over said receptacles as tops for the packages.

6. A packaging machine of the type wherein the product receptacles move through the machine at a substantially constant horizontal speed, said packaging machine comprising:

a. a series of receptacle carriers including means arranged to engage packaging material and to hold such material fixed relative to the carriers;

b. a carriage arranged to move reciprocally in a plane parallel to the plane of said carriers and which, while the packaging operations take place, travels at the same speed as said carriers;

c. an upper frame located above said carriers and mounted upon said carriage, said upper frame being arranged to move toward and into close proximity to the upper surface of said carriers during that portion of the cycle in which the packaging operations occur;

d. a lower frame, located below said carriers, and mounted upon said carriage, said lower frame being arranged to move toward and into close proximity to the lower surface of said carriers during that portion of the cycle in which the packaging operations occur; and e. packaging machinery mounted upon said upper and lower frames movable against and into contact with the carriers to clamp the packaging machinery and the moving carriers together for the purpose of performing the packaging operations upon the materials held by the carriers.

7. The packaging machine of claim 6 wherein the packaging machinery mounted upon said frame includes:

a. means to apply a top closure member across the top of the carriers in which the receptacles are held;

b. a top closure member pre-heat and initial seal station wherein the top closure member is initially sealed and heated for thermoforming;

c. a top closure member forming station for thermoforming the top closure member; and d. a final seal station for completely sealing the top closure member to the receptacle.

8. The packaging machine of claim 6 further including forming machinery mounted upon said upper and lower frames.

9. The packaging machine of claim 8 wherein the forming machinery mounted upon said frame includes:

a. a heating section for heating thermoformable plastic; and b. forming dies for forming the heated thermoformable plastic into receptacles.

10. The packaging machine of claim 9 wherein the carriers have two side-by-side bottomless cavities extending through the carrier.

11. A thermoforming section including:

a. a supply of thermoformable plastic;

b. a movable carriage;

c. a conveyor passing alongside said carriage;

d. a plurality of carriers adjacent to one another and mounted upon said conveyor;

e. support means for slidably mounted said carriage;

f. means for moving said carriage for at least a portion of its travel in the same direction and at the same speed as that of the conveyor;

g. an upper platform arranged to move vertically, with respect to the longitudinal axis of the conveyor, toward the conveyor;

h. a lower platform arranged with respect to the conveyor to move vertically, with respect to the longitudinal axis of the conveyor toward said conveyor with said upper and lower platform being parallel to the longitudinal axis of the conveyor and with the conveyor passing between the upper and lower platforms;

i. means for moving said upper and lower platform toward said conveyor;

j. a pair of thermoforming dies mounted upon said upper and lower platforms for thermoforming the package, whereby said upper and lower platforms move together to clamp the thermoforming dies against the carrier for the purpose of performing the thermoforming operation on the thermoformable plastic.

12. The thermoforming apparatus of claim 11 wherein the carrier includes a cavity in the center portion thereof.

13. A packaging machine comprising:

means to support packaging material so as to move it at constant speed through a series of operating positions;

a packaging module having two sections on opposite sides of said sheet of packaging material respectively and arranged to be reciprocated together to engage said packaging material while moving therewith at said constant speed, said module sections thereafter being separated and retracted longitudinally to reengage said material for a further movement therewith;

each of said module sections comprising a plurality of separate stations disposed in sequence along the path of movement of said material, each of said stations including different packaging means to perform different packaging functions upon said material;

all of said packaging means being operable concurrently while said module sections engage said material, with a given portion of said material being subjected to a series of sequential packaging operations performed by said module sections as said portion of material passes through the region of said module sections.

14. Apparatus as in claim 13, wherein one of said stations includes means to heat the packaging material to a temperature for forming it by stretching.

15. Apparatus as in claim 14, wherein a station subsequent to said one station includes means for stretching said packaging material and cooling it in its stretched condition.

16. A packaging system comprising:

means to support packaging material and to move it at constant speed;

a packaging module having two sections on opposite sides of said packaging material respectively, at least one of said sections being arranged to be reciprocated relative to the other section to engage said material therebetween while both of said sections move therewith at said constant speed, said module sections thereafter being separated and retracted longitudinally to reengage said material for a further movement therewith in cyclical fashion;

each of said module sections comprising at least two separate stations disposed in sequence along the path of movement of said sheet of material, each of said stations including different packaging means to perform different packaging functions upon said material;

all of said packaging means being operable concurrently while said module sections engage said material, with a given portion of said material being subjected first to one of said packaging functions as said module sections advance with said packaging material, said module sections thereafter being retracted longitudinally and then advancing with said material to perform on said given portion of said material the next of said packaging functions, whereby each portion of the packaging material is subjected to at least two packaging functions by said two packaging stations respectively as the packaging material portion passes through the regions of said module.

17. The packaging system of claim 16, wherein said module sections are both reciprocably movable in synchronism towards and away from said packaging material.

18. The packaging system of claim 17, wherein said module comprises a carriage which is slidable in reciprocating fashion in a direction parallel to movement of said packaging material.

19. The packaging system of claim 16, including means to supply a sheet of packaging material to be carried along with said first packaging material through said packaging module;

said module sections including means to operate on both said sheet of packaging material and said first packaging material for forming completed packages.

20. The packaging system of claim 16, wherein the module includes:

a. a series of package carriers for moving said material through said module;

b. a carriage forming part of said module;

c. means for slidably supporting said carriage for movement parallel to said carriers;

d. means for reciprocally moving said carriage upon said slidable supporting means so as to enable the carriage to travel for that portion of its cycle during which the packaging operation takes place at the same speed and in the same direction as that of the package carriers;

e. an upper frame carried upon said carriage, mounted above said package carriers and arranged so as to move downwardly toward said package carriers;

f. a lower frame carried upon said carriage, mounted below said package carrier and arranged so as to move upwardly toward said package carrier;

g. means for moving said upper and lower frames towards the package and holding the frames in close proximity with the carriers during that portion of the cycle when the packaging operations are performed; and h. thermoforming machinery mounted upon said upper and lower frames and arranged so as to come into contact with and to clamp upon the package carrier when said frames move toward the package carrier to thermoform the packaging material.

21. The packaging system of claim 20 wherein the thermoforming machinery includes:

a. a heating station to heat the packaging material to an elevated temperature prior to thermoforming said material; and b. a forming station to thermoform the material into a cup-like receptacle.

22. Apparatus for making sealed packages of the type including a product-containing receptacle and a top sealed to the receptacle around the periphery thereof; said apparatus comprising:

conveyor means including support means arranged to engage sequential sets of packaging material and to transport said material along a substantially horizontal path at constant speed to permit sequential packaging operations to be performed thereon while in movement;

said support means including means to fixedly hold said packaging material immobilized relative to said conveyor means during said movement;

a packaging module having two sections located respectively above and below said path of movement, at least one of said sections being arranged to be reciprocated relative to the other section to engage said material therebetween while both of said sections move with said material at said constant speed, said module sections thereafter being separated and retracted longitudinally to reengage said material for a further movement therewith in cyclical fashion;

each of said module sections comprising operating means to perform packaging functions upon said material, said operating means being located to avoid interfering with said support means while the latter is in operative engagement with said packaging material, said support means serving to prevent movement of said packaging material relative to said operating means while the latter is in said operative engagement condition; and drive means to move both said module sections horizontally together at a speed matching that of said packaging material while said operating means is in said operative position.

23. Apparatus for making sealed packages as claimed in claim 22, wherein each of said sections comprises first and second operating stations arranged in tandem relationship so as to engage longitudinally-adjacent portions of said packaging material simultaneously;

said tandem operating stations having identical sets of operating elements so as to perform the same packaging operations on said adjacent portions of said packaging material.

24. Apparatus for making sealed packages as claimed in claim 23, wherein each of said operating stations comprises a pair of side-by-side identical operating units arranged to perform identical operations on the corresponding side-by-side areas of said packaging material.

25. Apparatus for making sealed packages of the type including a product-containing receptacle with a top sealed around the periphery thereof; said apparatus comprising:

means to support a continuous sheet of packaging material and to move it at constant speed along a substantially horizontal path;

first and second packaging modules;

said first module comprising a first pair of horizontally-movable sections carrying a first set of operating means, said first sections being located respectively above and below said path of movement;

said second module comprising a second pair of horizontally-movable sections carrying a second set of operating means, said second sections being located respectively above and below said path of movement at positions downstream of said first module sections;

at least one section of each said pair of sections being arranged to be reciprocated relative to the other section thereof to effect engagement of the corresponding set of operating means with said sheet of packaging material while the pair of module sections move horizontally with the sheet of material;

cyclical drive means comprising means for moving both said pairs of module sections together, first in said downstream direction and then with a retracting movement in an upstream direction;

said drive means including means for producing said relative reciprocating movement of said pairs of module sections and to effect engagement of said operating means with said sheet of packaging material during a portion of the downstream movement of said module section pairs while said module sections move at the same speed as said packaging material;

said first set of operating means comprising thermoforming means including means to heat the packaging material and to stretch portions thereof so as to produce cup-shaped cavities;

means located between said first and second modules to supply packaging material over the cavities formed in said continuous sheet of packaging material to serve as tops for the cup-shaped cavities formed by said first set of operating means;

said second set of operating means comprising means to heat-seal said tops to the peripheries of said cup-shaped cavities to provide sealed packages.

26. Apparatus as claimed in claim 25, wherein said drive means includes means to move said first and second pairs of module sections with synchronized matching movements, said pairs of sections being moved horizontally together, both downstream and upstream, and being relatively reciprocated together so as to engage said sheet of packaging material concurrently while moving therewith.

27. Apparatus as claimed in claim 25, wherein said supply means is arranged to furnish a continuous top web of plastic packaging material above said cavities to form cover tops therefor.

28. Apparatus for making sealed packages of the type including a product-containing receptacle with a top sealed around the periphery thereof; said apparatus comprising:

means to support a continuous sheet of packaging material and to move it at constant speed along a substantially horizontal path;

first and second packaging modules;

said first module comprising a first pair of horizontally-movable sections carrying a first set of operating means, said first sections being located respectively above and below said path of movement;

said second module comprising a second pair of horizontally-movable sections carrying a second set of operating means, said second sections being located respectively above and below said path of movement at positions downstream of said first module sections;

at least one section of each said pair of sections being arranged to be reciprocated relative to the other section thereof to effect engagement of the corresponding set of operating means with said sheet of packaging material while the pair of module sections move horizontally with the sheet of material;

cyclical drive means comprising means for moving both said pairs of module sections together, first in said downstream direction and then with a retracting movement in an upstream direction;

said drive means including means for producing said relative reciprocating movement of said pairs of module sections and to effect engagement of said operating means with said sheet of packaging material during a portion of the downstream movement of said module section pairs while said module sections move at the same speed as said packaging material;

said first set of operating means comprising thermoforming means including means to heat the package material and to stretch portions thereof so as to produce cup-shaped cavities;

means located between said first and second modules to supply packaging material over the cavities formed in said continuous sheet of packaging material to serve as tops for the cup-shaped cavities formed by said first set of operating means;

said second set of operating means comprising means to heat-seal said tops to the peripheries of said cup-shaped cavities to provide sealed packages;

said second set of operating means further including sealing means arranged to establish an air-tight chamber for the packages, to accomodate the evacuation thereof prior to effecting a final seal and venting of said air-tight chamber.

29. Apparatus as claimed in claim 28, wherein said second set of operating means includes top-web-forming means comprising means to heat the top web to provide for the stretching of marginal portions of the regions which will serve as covers for said receptacle cavities, prior to venting of said air-tight chamber.

*30. A packaging system comprising:*

*means to support packaging material and to move it at constant speed;*

*a packaging module having at least one section on a side of said material which is opposite to said support means, said section being arranged to be reciprocated relative to said support means to operate on said material while both said section and said support means move therewith at said constant speed, said module section thereafter being moved vertically and retracted longitudinally for a further movement therewith in cyclical fashion;*

*said module section comprising at least two separate stations disposed in sequence along the path of movement of said sheet of material, each of said stations including different packaging means to perform difference packaging functions upon said material;*

*all of said packaging means being operable concurrently while said module section is in operative position with said material, with a given portion of said material being subjected first to one of said packaging functions as said module section advances with said packaging material, said module section thereafter being retracted longitudinally and then advancing with said material to perform on said given portion of said material the next of said packaging functions, whereby each portion of the packaging material is subjected to at least two packaging functions by said two packaging stations respectively as the packaging material portion passes through the regions of said module.*

*31. Apparatus for making sealed packages of the type including a product-supporting component with a cooperating closure component sealed thereto; said apparatus comprising:*

*means to support a continuous sheet of packaging material and to move it at constant speed along a substantially horizontal path;*

*first and second packaging modules;*

*said first module comprising a first pair of horizontally-movable sections carrying a first set of operating means, said first sections being located respectively above and below said path of movement;*

*said second module comprising a second pair of horizontally-movable sections carrying a second set of operating means, said second sections being located respectively above and below said path of movement at positions downstream of said first module sections;*

*at least one section of each said pair of sections being arranged to be reciprocated relative to the other section thereof to effect engagement of the corresponding set of operating means with said sheet of packaging material while the pair of module sections move horizontally with the sheet of material;*

*cyclical drive means comprising means for moving both said pairs of module sections, each pair being moved in one phase of its cycle in said downstream direction and then in the upstream direction in the next phase of its cycle;*

*said drive means including means for producing said relative reciprocating movement of said pairs of module sections and to effect engagement of said operating means with said sheet of packaging material during a portion of the downstream movement of said module section pairs while said module sections move at the same speed as said packaging material;*

*said first set of operating means comprising thermoforming means including means to heat the packaging material and to stretch portions thereof so as to produce product-supporting package components;*

*means located between said first and second modules to supply packaging material over the product-supporting package components formed in said continuous sheet of packaging material to serve as closures arranged to cooperate with the components formed by said first set of operating means so as to define complete packages;*

*said second set of operating means comprising means to seal said closures to said product-supporting components to provide sealed packages.*

*32. Apparatus for making sealed packages of the type including a product-supporting component with a cooperating closure component sealed thereto; said apparatus comprising:*

*means to support a continuous sheet of packaging material and to move it at constant speed along a substantially horizontal path;*

*first and second packaging modules;*

*said first module comprising a first pair of horizontally-movable sections carrying a first set of operating means, said first sections being located respectively above and below said path of movement;*

*said second module comprising a second pair of horizontally-movable sections carrying a second set of operating means, said second sections being located respectively above and below said path of movement at positions downstream of said first module sections;*

*at least one section of each said pair of sections being arranged to be reciprocated relative to the other section thereof to effect engagement of the corresponding set of operating means with said sheet of packaging material while the pair of module sections move horizontally with the sheet of material;*

*cyclical drive means comprising means for moving both said pairs of module sections together, first in said downstream direction and then with a retracting movement in an upstream direction;*

*said drive means including means for producing said relative reciprocating movement of said pairs of module sections and to effect engagement of said operating means with said sheet of packaging material during a portion of the downstream movement of said module section pairs while said module sections move at the same speed as said packaging material;*

*said first set of operating means comprising thermoforming means including means to heat the packaging material and to stretch portions thereof so as to produce product-supporting components;*

*means located between said first and second modules to supply packaging material over the product-supporting components formed in said continuous sheet of packaging material to serve as cooperating closure components for the product-supporting components formed by said first set of operating means;*

*said second set of operating means comprising means to effect a seal between said closure components and peripheries of said product-supporting components to provide sealed packages;*

*said second set of operating means further including sealing means arranged to establish an air-tight chamber for the packages, to accommodate the evacuation thereof prior to effecting a complete seal of each package and venting of said air-tight chamber.*

* * * * *